April 5, 1960   H. B. NUNNELEE ET AL   2,931,886
APPARATUS FOR CLADDING
Filed April 29, 1958

Inventors
Harold B. Nunnelee
Willard A. Schumbacker
by Arthur M. Streich
Attorney

United States Patent Office 2,931,886
Patented Apr. 5, 1960

2,931,886
APPARATUS FOR CLADDING

Harold B. Nunnelee, Waukesha, and Willerd A. Schumbacker, West Allis, Wis., assignors to Allis-Chalmers Manufacturing Company, Milwaukee, Wis.

Application April 29, 1958, Serial No. 731,777

5 Claims. (Cl. 219—76)

This invention relates to a welding apparatus particularly adapted for cladding a base metal member with a layer of the same or different metal. More particularly, this invention relates to a welding apparatus for depositing a weld metal by means of a submerged electric arc which utilizes an electrode wire of indefinite length and a feed wire of indefinite length, both of which are continuously fed into an arc generated by the electrode.

Cladding is a process often used to overlay a metallic workpiece with a metal having better wearing characteristics than the workpiece. The cladding metal is therefore usually a wear resistant metal, such as stainless steel, and the workpiece a less expensive metal, such as ordinary carbon steel, other low alloy steels, or cast iron. It is desirable to minimize the dilution of the clad overlay metal by the workpiece metal.

In the past, a single welding unit has been used for depositing an overlay metal upon a workpiece. The use of a single welding unit has the advantage of easy feed control and even distribution of weld metal but also has the disadvantage of a low rate of deposition, making cladding by this method very time consuming. Machines having a plurality of welding arcs have been used and such machines overcome the disadvantage of low deposition rate of overlay metal, but it is difficult to maintain a balanced flow of current to the respective arcs. Furthermore, variations in the rate of feed, in the composition or in the diameter of the electrodes cause the current being supplied to the individual electrodes to be unbalanced. Thus, a system using a plurality of electric arcs encounters difficulty in providing a substantially uniform overlay and in controlling dilution of the overlay with the workpiece metal.

This shortcoming was initially solved by using a single electrode and feeding a wire into the arc thereby increasing the deposition rate of overlay metal without incurring the difficulty possessed by machines having a plurality of welding arcs. More specifically, the prior art in one instance teaches the use of a feed wire to increase the amount of metal overlay by having the electrode perpendicular to the workpiece and the feed wire leading to the electrode at an acute angle to the workpiece. The tip of the feed wire in this arrangement is positioned intermediate the tip of the electrode and the workpiece to allow the arc to consume the end of the feed wire. By placing the electrode perpendicular to the workpiece, the arc is focused and concentrated on a rather small spot. To increase the size of this spot and at the same time reduce the intensity of the arc which increases the tendency to dilute the overlay metal, the prior art in another instance teaches tilting the electrode to be perpendicular to the feed wire rather than to the workpiece. In this position, the shank of the electrode trails the electrode tip whereas the shank of the feed wire leads the feed wire tip. Although this may reduce the intensity of the arc and therefore, a decreased dilution of the overlay metal, the spot is enlarged trailing the weld area. Thus, although dilution of the overlay metal may be reduced, this technique leaves something yet desired in the way of increased speed of cladding.

According to the present invention, the electrode is tilted toward the feed wire so that both the tip of the electrode and the tip of the feed wire trail their respective shank portions. This brings both the shank of the electrode and the shank of the feed wire closer to the surface upon which an overlay metal is to be deposited than is achieved by the prior art techniques referred to. The spot covered by the arc leading the weld area will therefore be enlarged. Thus, more of the feed wire will be covered and consumed by the arc and a more rapid covering of the workpieces is achieved.

To achieve continuous automatic operation, the present invention utilizes an apparatus having means to provide relative motion between a unit including an electrode and feed wire, and a workpiece, to deposit a ribbon of weld in a predetermined direction across a surface of a workpiece. Means are included to provide relative oscillatory movement between the welding unit and the workpiece transverse to the ribbon of weld material thereby increasing the width of the ribbon. Means are also included to provide an equal feed rate of electrode and feed wire, and means to dispense a suitable granular flux to the area to be clad. Suitable welding control means are provided to control and regulate the overall operation.

An object of this invention is to provide a new and improved apparatus for depositing an overlay metal upon a metallic surface having an arrangement of the electrode and feed wire that will provide enlarged coverage by the arc leading the weld area, increased coverage of the feed wire, and decreased concentration of the arc on the already deposited metal.

Another object of this invention is to provide a new and improved apparatus to clad a metallic workpiece by a submerged electric arc having an increased rate of deposition with a minimum amount of dilution of the overlay metal with the workpiece metal.

Another object of this invention is to provide a new and improved apparatus to clad a metallic workpiece that will deposit an even layer of overlay metal.

Another object of this invention is to provide a new and improved apparatus to clad a metallic workpiece that will deposit a comparatively smooth layer of overlay metal.

How these and other objects are attained will become apparent from the following description read in conjunction with the accompanying drawings, in which.

Figure 1:
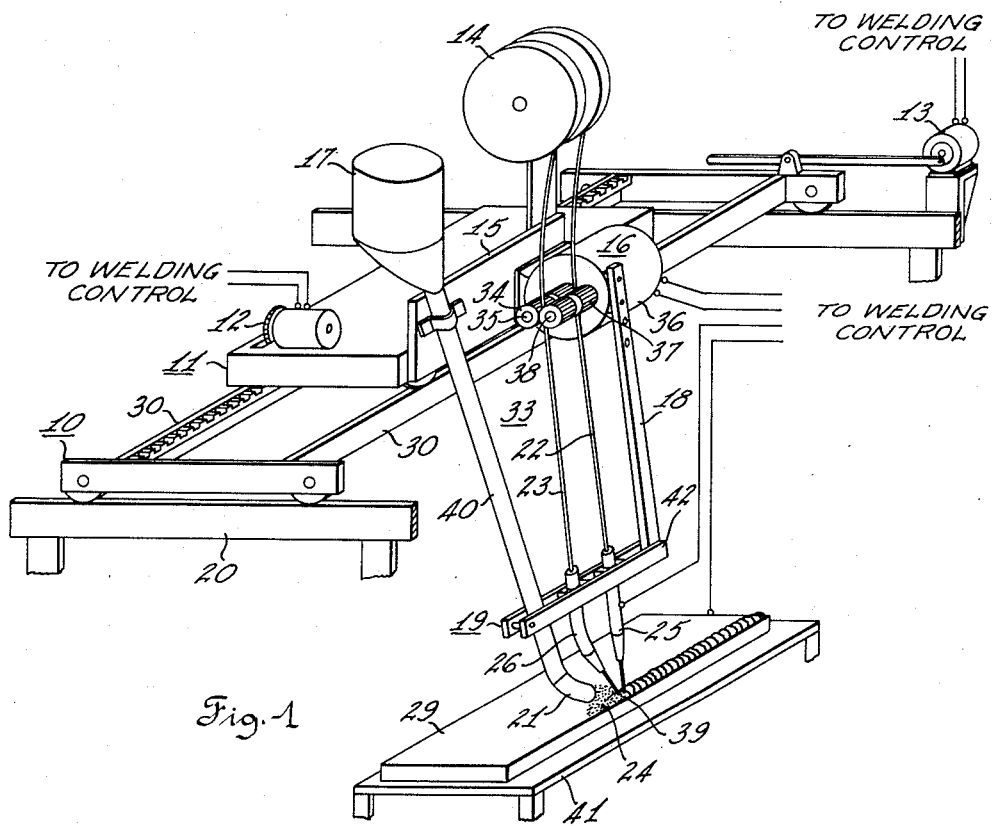
Fig. 1 is a partial schematic isometric view of the present invention.
Figure 2:
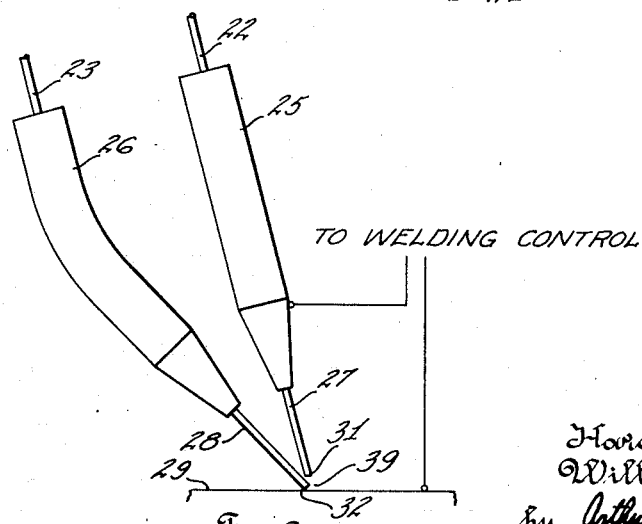
Fig. 2 is an enlarged view of a portion of the apparatus of Fig. 1 showing the spacing and angular relationship between the feed wire, the electrode, and the surface to be clad.

The present invention is primarily directed to the use of a submerged electric arc welding apparatus for cladding wear resistant metal over a metallic workpiece. The apparatus comprises a trolley 10 bridging a work area 33. The trolley 10 rides a track 20 and supports a track 30 upon which a carriage 11 rides. The carriage 11 is provided with lateral motion means 12 and oscillatory motion means 13.

A first generally vertical support member 15 is mounted to and extends above the carriage 11 for supporting and vertically spacing electrode and feed wire supply reels 14, a roller feed device 16 and a flux supply hopper 17. A second generally vertical support member 18 is adjustably mounted to the roller feed device 16 and extends below the carriage 11 to support a cladding head 19 and a flux dispensing spout 21 adjacent to and immediately above the welding zone 39.

An uncoated current conducting wire hereinafter referred to as the electrode 22 and an uncoated noncurrent conducting feed wire, hereinafter referred to as a feed wire 23, being continuously fed, are submerged below a granular flux 24. The electrode 22 and the feed wire 23 are guided to the welding area by means of cladding head 19 comprising an adjustably mounted welding head 25 and an adjustably mounted and suitably insulated guide head 26. This arrangement allows electrode 22 and the feed wire 23 to maintain a space converging electrically insulated relationship to each other. The electrode 22 and feed wire 23 extend downward from their respective heads 25, 26 having shanks 27, 28 and tip portions 31, 32 extending below their respective heads 25, 26. The tip portion 32 of the feed wire 23 is positioned intermediate the electrode 22 and a workpiece 29 to be overlaid. Therefore, the guide head 26 leads the weld head 25 in a tandem arrangement and the angular relationship is such that the shank portions 27, 28 lead their respective tip portions 31, 32.

The surfaces of the workpiece 29 and trolley 10 are maintained in a vertically spaced relationship to each other by suitable means, such as table 41. Table 41 has adjusting means whereby the surface of workpiece 29 is maintained parallel to and accurately spaced from trolley 10.

The guide head 26 is curved to avoid binding of the wire as it passes therethrough and to prevent arcing between the heads while maintaining the proper space and angular relationship therebetween. It is found that feeding a one-eighth inch stainless steel feed wire through a guide head having a radius of curvature of four and three-eighths inches minimizes friction forces therebetween.

The electrode and feed wire supply reels 14 are rotatably attached to the first vertical support member 15 and are provided with braking means (not shown) to prevent the reels 14 from uncoiling.

As shown in Fig. 1, a roller feed device 16 withdraws electrode 22 and feed wire 23 from the supply reels 14 and feeds the wires 22, 23, respectively, to the welding head 25 and the guide head 26 at equal feed rates. Individually insulated feed drive rollers 34 are mounted on a feed drive shaft 35 and driven by a variable speed electric motor 36. In a similar manner, insulated idler rollers 37 are mounted on an idler shaft 38 and coact with each respective drive roller 34 to maintain proper operating tension thereby insuring positive feeding.

In operation, the electrode 22 and feed wire 23 are withdrawn from supply reels 14 by the roller feed device 16. The weld head 25 and guide head 26 are tilted to receive and guide the electrode 22 and feed wire 23 in a spaced angular relationship to each other and the workpiece 29. An included acute angle is formed between the feed wire 23 and electrode 22.

The shanks 27, 28 of the electrode 22 and feed wire 23 lead their respectively tips 31, 32 to force the arc, which tends to seek the path of the least resistance, usually the shortest path, to cover a larger area preceding the weld area thereby decreasing the dilution of the overlay metal with the workpiece metal.

The feed wire 23, being positioned tandem to, leading and within the arc establishable between the electrode 22 and the workpiece 29, is thereby covered and consumed resulting in a ribbonlike overlay. The tilting of the electrode 22 and feed wire 23 also generates a gentle washing motion of the molten metal against the previously deposited overlay material, tending to make a smooth and even surface. As the feed wire 23 and electrode 22 are progressively melted, they are moved with the carriage 11 at a predetermined speed over the surface of the workpiece 29.

It should be apparent to one skilled in the art that it is also possible to move the workpiece 29 and to practice the present invention by utilizing stationary heads or by any similar combination.

A suitable granular flux 24 is supplied to the workpiece 29 to submerge the welding zone 39 as it progresses along the workpiece 29. A flux supply hopper 17 is attached to the support member 15 above the carriage 11 and adjacent to the electrode and feed wire supply reels 14. A downward extending tube 40 precedes the tandem mounted heads and connects the hopper 17 to a flux dispensing spout 21 attached to leg portion 42 of the second vertical support member 18. The spout 21 is positioned to dispense flux 24 in a quantity sufficient to submerge the arc during the welding process.

The tandem position heads 25, 26 are oscillated in a plane transverse to the lateral motion of the carriage 11 permitting a fine degree of control over the weld shape. This results in a smooth and even weld which is uniformly even and is characterized by smooth and even overlapping of the successive beads. When cladding with expensive high alloy materials, it is generally desirable to produce a thin deposition of metal over the workpiece 29. The process as disclosed results in a controllable thin uniform layer having smooth and even weld surfaces and satisfactory overlapping without any appreciable slag entrapment.

Submerged electric arc welding with a feed wire requires using wires of unequal size. The electrode 22 has a higher burnoff rate than the feed wire 23, presumably because the arc is hottest where it leaves the end of the electrode 22. It was found that in cladding with stainless steel, an electrode of three-sixteenths inch diameter and a feed wire one-eighth inch diameter produces the most satisfactory deposit of stainless steel upon a workpiece 29 of cast steel. In a similar manner, cladding a workpiece 29 with a high alloy metal other than stainless steel, the respective diameters of the electrode 22 and feed wire 23 can be easily ascertained by experimentation.

The rate at which the electrode 22 and feed wire 23 are fed to the welding zone 39 is determined by the size of the respective wires, the rate of lateral motion, and the welding current transmitted to the welding zone 39. A change in one variable must be compensated by a change in the remaining variables to maintain a balance. To accomplish this, a welding current source (not shown) is provided with control means capable of automatically varying the feed rate, lateral motion rate and current as required to maintain an overall balance.

Although the present invention has been described in connection with the cladding process, it is understood that the modifications and variations may be made without departing from the spirit and scope of the invention. Such variations and modifications apparent to those skilled in the art are considered to be within the view and scope of the invention as defined by the appended claims.

What is claimed is:

1. An apparatus for depositing a wire electrode and an additional feed wire as an overlay upon a metallic surface comprising: a cladding head assembly; support means defining a work area, said support means having a first portion connected to said cladding head to support said cladding head and a second portion for supporting an object having a metallic surface that is to be overlaid, at least one of said portions of said support means being movable to provide relative motion between said head and said second portion of said support means; wire supplying means connected to said first portion of said support means supplying said head with a feed wire and a wire electrode, each of said wires presenting a tip portion and a shank portion; and said head assembly including wire guiding means for positioning each of said wires, said wire electrode being positioned to be tilted relative to a vertical axis through said electrode tip and with said electrode shank leading said electrode tip in the direction of said relative motion of said head relative to said second portion of said support means, and said feed wire being positioned with said shank portion and tip portion thereof each being arranged below said corresponding shank and tip portions of said electrode and in the same vertical plane therewith.

2. An apparatus including welding control means for depositing a consumable wire electrode and additional feed wire as an overlay upon a metallic surface comprising: a cladding head assembly; support means defining a work area, said support means having a first portion connected to said cladding head assembly to support said cladding head assembly and a second portion for supporting an object having a metallic surface that is to be overlaid, at least one of said portions of said support means being movable to provide relative motion between said cladding head assembly and said second portion of said support means; wire supplying means connected to said first portion of said support means for supplying said cladding head assembly with a feed wire and a wire electrode, each of said wires presenting a tip portion and a shank portion; single feed means mounted to said support means intermediate said wire supplying means and said cladding head assembly, said feed means being responsive to said control means feeding said wire electrode and feed wire at equal linear feed rates; and said cladding head assembly including wire guiding means for positioning each of said wires, said wire electrode being positioned to be tilted relative to a vertical axis through said electrode tip and with said electrode shank leading said electrode tip in the direction of said relative motion of said cladding head assembly relative to said second portion of said support means, and said feed wire being positioned with said shank portion and tip portion thereof each being arranged below said corresponding shank and tip portions of said electrode and in the same vertical plane therewith.

3. An apparatus including welding control means for depositing a consumable wire electrode and additional feed wire as an overlay upon a metallic surface comprising: a cladding head assembly; support means defining a work area, said support means having a first portion connected to said cladding head assembly to support said cladding head assembly and a second portion for supporting an object having a metallic surface that is to be overlaid, at least one of said portions of said support means being movable to provide relative motion between said head and said second portion of said support means; wire supplying means connected to said first portion of said support means for supplying said cladding head assembly with a feed wire and a wire electrode, said wire electrode having a greater diameter than said feed wire diameter, each of said wires having a tip portion and a shank portion; single feed means mounted to said first portion of said support means intermediate said wire supplying means and said cladding head assembly, said feed means responsive to said welding control means feeding said unequal diameter electrode and feed wire at equal linear feed rates; and said cladding head assembly including wire guiding means for positioning each of said wires, said wire electrode being positioned to be tilted relative to a vertical axis through said electrode tip and with said electrode shank leading said electrode tip in the direction of said relative motion of said cladding head assembly relative to said second portion of said support means, and said feed wire being positioned with said shank portion and tip portion thereof each being arranged below said corresponding shank and tip portions of said electrode and in the same vertical plane therewith.

4. An apparatus including welding control means for depositing a consumable wire electrode and additional feed wire as an overlay upon a metallic surface comprising: a cladding head assembly; support means defining a work area, said support means having a first portion connected to said cladding head assembly to support said cladding head assembly and a second portion for supporting an object having a metallic surface that is to be overlaid, at least one of said portions of said support means being movable to provide relative motion between said cladding head assembly and said second portion of said support means; wire supplying means connected to said first portion of said support means for supplying said cladding head assembly with a feed wire and a wire electrode, said wire electrode and feed wire having diameters proportioned to provide equal burnoff at equal linear feed rates, each of said wires having a tip portion and a shank portion; single feed means mounted to said first portion of said support means intermediate said wire supplying means and said cladding head assembly, said feed means responsive to said welding control means feeding said proportioned diameter electrode and feed wires at equal linear feed rates, and said cladding head assembly including wire guiding means for positioning each of said wires, said wire electrode being positioned to be tilted relative to a vertical axis through said electrode tip and with said electrode shank leading said electrode tip in the direction of said relative motion of said cladding head assembly relative to said second portion of said support means, and said feed wire being positioned with said shank portion and tip portion thereof each being arranged below said corresponding shank and tip portions of said electrode and in the same vertical plane therewith.

5. An apparatus including welding control means for depositing a stainless steel wire electrode and additional stainless steel feed wire as an overlay upon a metallic surface comprising: a cladding head assembly; support means defining a work area, said support means having a first portion connected to said cladding head assembly to support said cladding head assembly and a second portion for supporting an object having a metallic surface that is to be overlaid, at least one of said portions of said support means being movable to provide relative motion between said cladding head assembly and said second portion of said support means; wire supplying means connected to said first portion of said support means for supplying said cladding head assembly with a stainless steel feed wire having a diameter of one-eighth inch and a stainless steel electrode, having a diameter of three-sixteenths inch, each of said wires having a tip portion and a shank portion; feed means mounted to said first portion of said support means intermediate said wire supplying means and said cladding head assembly, said feed means comprising equal diameter electrode and feed wire drive wheels and opposing idler wheels receiving therebetween said wire electrode and feed wire, said drive wheels mounted on a common shaft driven by a variable speed motor responsive to said welding control means and said idler wheels independently and resiliently mounted to provide a biasing force against the wire electrode and feed wire causing said wire electrode and feed wire to bear against said drive wheels and provide feeding of said wire electrode and feed wire at equal linear feed rates; and said cladding head assembly including wire guiding means for positioning each of said wires, said electrode being positioned to be tilted relative to a vertical axis through said electrode tip and with said electrode shank leading said electrode tip in the direction of said relative motion of said cladding head assembly relative to said second portion of said support means, and said feed wire being positioned with said shank portion and tip portion thereof each being arranged below said corresponding shank and tip portions of said electrode and in the same vertical plane therewith.

References Cited in the file of this patent

UNITED STATES PATENTS

| | | |
|---|---|---|
| 2,190,267 | Light | Feb. 13, 1940 |
| 2,427,350 | Carpenter et al. | Sept. 16, 1947 |
| 2,681,970 | Koopman | June 22, 1954 |
| 2,876,330 | Reinhardt | Mar. 3, 1959 |